(No Model.)
J. A. ASTON.
THILL COUPLING.
No. 301,201. Patented July 1, 1884.
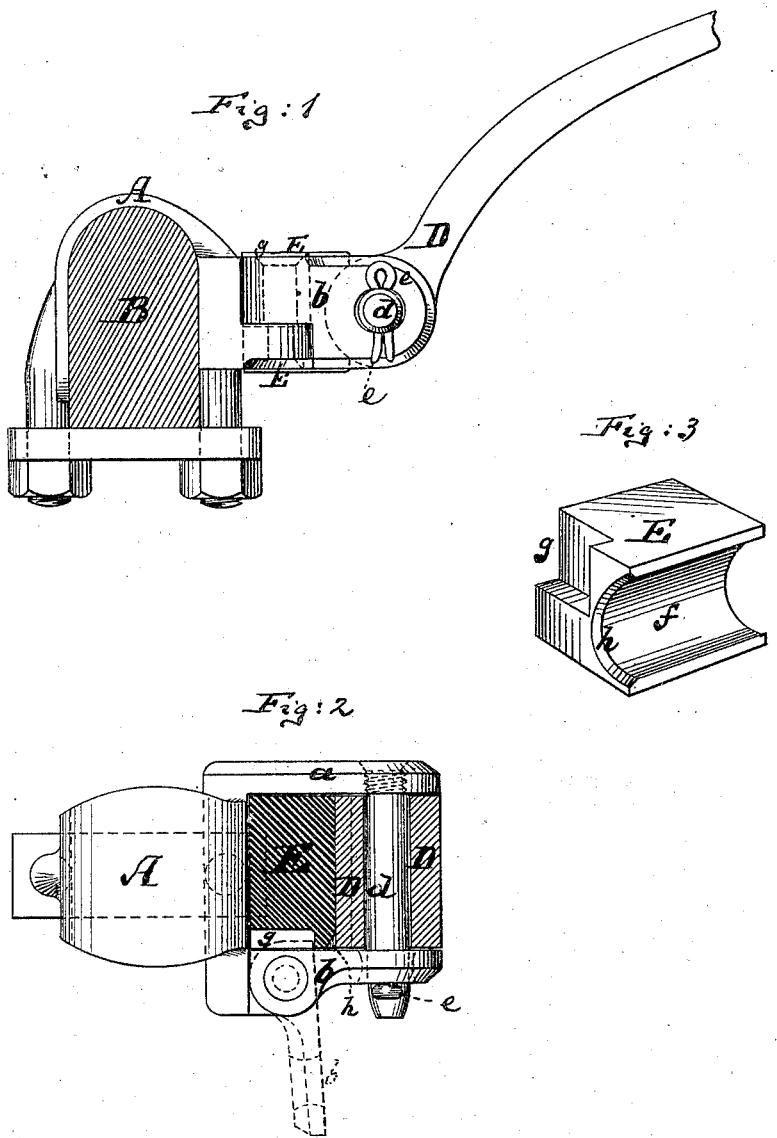
Witnesses:
John M. Speer.
Gustav Schueppé
Inventor:
John A. Aston
by his attorneys
Brésen & Steele

UNITED STATES PATENT OFFICE.

JOHN A. ASTON, OF BROOKLYN, NEW YORK.

THILL-COUPLING.

SPECIFICATION forming part of Letters Patent No. 301,201, dated July 1, 1884.

Application filed February 20, 1884. (No model.)

*To all whom it may concern:*

Be it known that I, JOHN A. ASTON, a resident of Brooklyn, in the county of Kings and State of New York, have invented an Improved Carriage-Clip, of which the following is a full, clear, and exact description, reference being made to the accompanying drawings, in which—

Figure 1 is a side view of my improved carriage-clip. Fig. 2 is a top view, partly in section, of the same. Fig. 3 is a perspective view of the cushion used therein.

This invention relates to that class of carriage-clips in which a hinged side piece is employed for the purpose of allowing the removal of the thill.

The invention consists in combining with such a clip a peculiar rubber cushion, as hereinafter more fully described.

In the drawings, the letter A represents that part of the clip which embraces the axle B, and which here is of the usual construction. From this part A projects forward a rigidly-attached lug or ear, $a$, and also a pivoted lug or ear, $b$. The lug $a$ carries the pintle $d$, to which the thill D is hinged. This pintle $d$ is, by preference, secured by screw-thread in the lug $a$, so that when worn it may be replaced by another. The pintle $d$ passes through a hole in the pivoted lug $b$, and carries a split pin, $e$, or analogous device, by which said lug $b$ is prevented from swinging outward. The dotted position in Fig. 2 shows the lug $b$ swung outward after the split pin $e$ has been taken out of the pintle.

E is a rubber cushion, of a length equal to the distance between the two lugs $a\ b$, and so wide as to fill the place behind the thill. Its general contour is clearly shown in Fig. 3—that is to say, its front face is concave, as at $f$, to receive the convex rear portion of the thill. On the side which is contiguous with the hinged lug $b$ it has a recess, $g$, cut out of it. Into this recess will fit the toe or back portion of the lug, $b$, whenever said lug is swung outward, as by dotted lines in Fig. 2. The front corner of this rubber cushion, on the side which is next the hinged lug $b$, is beveled, as shown at $h$. This is for the purpose of allowing the thill to be inserted without binding on the rubber.

The rubber cushion E has for its object to keep the thill and the pintle from rattling by its forward pressure against the thill, and also to prevent the split pin $e$ or its equivalent from dropping out. This the cushion prevents by its side-pressure.

I do not claim a clip having hinged side lug or rubber cushion. Such are old. But a cushion having recess $g$, and one having bevel-edge $h$, in the combination shown, has, to my knowledge, not previously been in use.

I claim—

1. In a carriage-clip having hinged lug $b$ and pintle $d$, the combination of said clip with the rubber cushion E, having concave front portion, $f$, and beveled edge $h$, substantially as herein shown and described.

2. In a carriage-clip having hinged lug $b$ and pintle $d$, the combination of said clip with the rubber cushion E, having recess $g$, concave portion $f$, and beveled edge $h$, substantially as herein shown and described.

JOHN A. ASTON.

Witnesses:
WILLY G. E. SCHULTZ,
JOHN M. SPEER.